Figure 1:
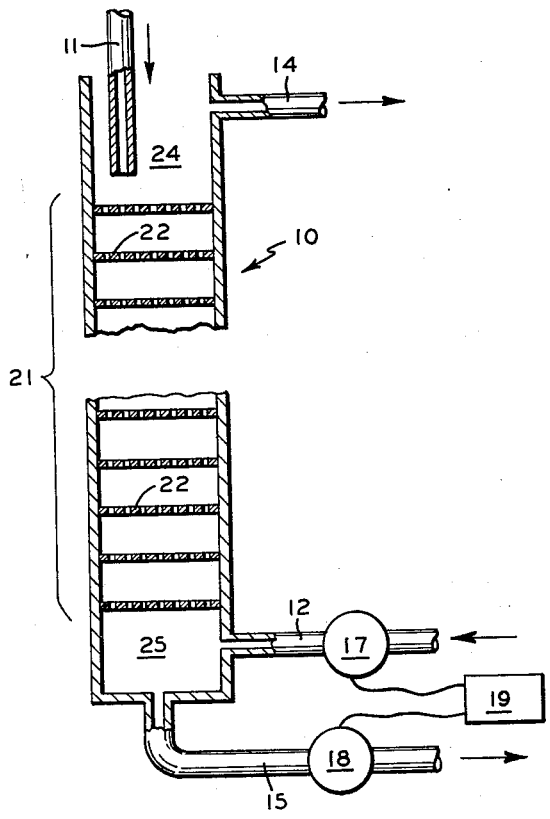

Jan. 28, 1964   B. R. SUARES   3,119,721
PULSATING TREATMENT COLUMN AND METHOD
Filed Feb. 13, 1961

INVENTOR.
BERNARD R. SUARES
BY *Philip Mintz*
ATTORNEY.

United States Patent Office 3,119,721
Patented Jan. 28, 1964

3,119,721
PULSATING TREATMENT COLUMN AND
METHOD
Bernard R. Suares, Colombes, Seine, France, assignor to
Dorr-Oliver Incorporated, Stamford, Conn., a corporation of Delaware
Filed Feb. 13, 1961, Ser. No. 89,029
Claims priority, application Great Britain Feb. 15, 1960
23 Claims. (Cl. 134—25)

This invention relates to a method and apparatus for the contacting of solids with liquid, and more particularly, to such method and apparatus wherein the incoming solid material in particulate form is treated with a liquid to separate the feed material into two fractions, one of which contains the solid material suspended in the treatment liquid and the other of which contains the portion of the feed material removed from the solid material. Still more particularly, this invention relates to such a process, such as, extraction, washing, lixiviation, leaching, etc. which is performed continuously and which is expedited by means of pulsations applied to the liquid.

Typical of the sort of treatment with which the present invention may be concerned, one can envisage a washing treatment in which a mother liquor of water containing solute salt and carrying sand in suspension is treated to eliminate substantially all the solute salt, except for perhaps a very small innocuous percentage, so that what remains as an end product is the sand in suspension, but in which the original mother liquor has been virtually replaced by water. This is typical of one stage in an ore beneficiation process. In such a step it is of importance that the washing should involve as low as possible an increase of the dilution of the mother liquor because, in later steps of such processes, all dilution water has eventually to be evaporated and, what is also important, ore deposits characteristically most often seem to be found in areas where water has to be conserved. In another stage of such a process the reverse situation can occur to the extent that it may be desired to transfer the ore from an aqueous water suspension into a salt solution. In another stage the requirement may be one of so-called desliming to remove from a raw ore the contaminating clay or clay-like material adhering to the ground ore, which contaminating material is difficult to wash off the sandy particles.

It is to be understood that the foregoing reference to treatments involving ores merely gives some examples of the field of application of the present invention emerging from the basic development work in that field. However, there are, no doubt, many processes in which it is required to effect intimate contact between fine particles in order to change the physical or chemical character of a suspension of solids in a fluid, to which the invention is equally applicable. For example, one can contemplate its feasibility as agitating apparatus.

In one of its aspects the present invention consists in apparatus comprising a chamber of substantial vertical extent for effecting intimate contact between liquids and solids in which contact is effected between downwardly migrating solids, which may be suspended in a carrier mother liquor, and a treatment liquid fed into the chamber. In this chamber a treatment zone is defined over a substantial vertical extent intermediate the top and the bottom of the chamber by a substantially rigid or stable assembly of obstruction members, or a random arrangement of parallel bars and/or crossed bars extending across the interior of the chamber, whereby at least the vertical unrestricted continuity of the treatment zone is interrupted. Provision is made for pulsation of the material contained in the column, which pulsation is preferably achieved by introducing treatment liquid into the column at timed spaced intervals at a level below the base of the treatment zone but spaced upwardly from the finally treated underflow product outlet at the bottom of the chamber, such introduction being effected in a coordinated timed relationship with withdrawal of treated underflow product from the settled material at the bottom of the chamber.

The effect of the coordinated introduction of treatment liquid and corresponding withdrawal of treated product is that, with the introduction of the treatment liquid the whole column is, as it were, raised, and that, with the subsequent corresponding withdrawal of treated product, it is lowered again, and this alternate raising and lowering seems to confine turbulence to zones of vertical extent which is substantially less than would be encountered without such a combination.

It is to be appreciated that the pulsation of the material in the treatment zone can be effected in other ways within the scope of the present invention. For example, it is conceivable that in many instances both the introduction of treatment liquid and withdrawal of treated product could be continuous and that pulsation of the column could be achieved by a pulsation device of a series of such devices operative alternately to introduce into, and withdraw liquid from, the column at appropriately timed intervals. Another possibility is to support the sieve trays or other obstruction members in the column as an assembly capable of being axially reciprocated within the stationary chamber or, conversely, the chamber could be vertically reciprocable while the assembly remained stationary. It is even conceivable that any of the foregoing suggested measures for achieving the pulsation effect could be employed conjointly.

Figure 2:
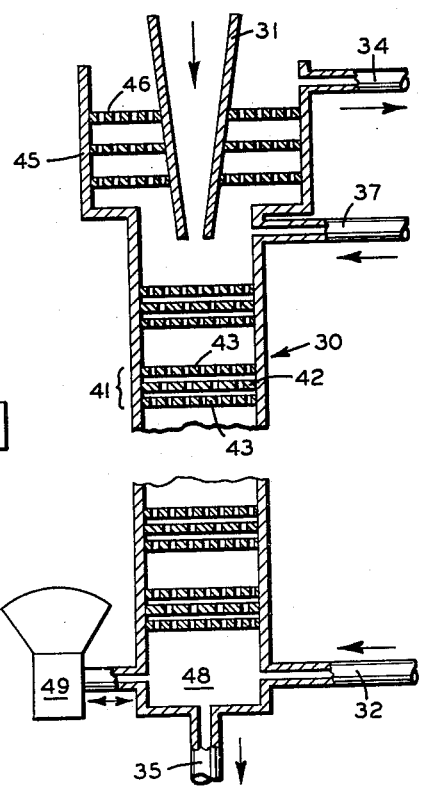

In order to provide a clearer and better understanding of the nature of this invention, reference may be had to the following detailed description of specific embodiments of this invention in conjunction with the accompanying drawings in which:

FIGURE 1 is a diagrammatic sectional elevation illustrative of a presently considered preferred embodiment of the present invention; and FIGURE 2 is a similar illustration of a modified form of the apparatus according to the present invention.

Referring next to the drawings, and more particularly, to FIG. 1, there is illustrated an upright treatment column 10 provided with a feed inlet conduit 11 near the top thereof and a treatment liquid inlet 12 near the bottom thereof. Column 10 is also provided with an overflow outlet 14 near the top thereof and an underflow outlet 15 near the bottom thereof. Treatment liquid inlet 12 and underflow discharge conduit 15 are provided with pumps 17 and 18, respectively, which pumps are capable of producing an intermittent pumping action under the influence of timer-synchronizer 19.

Within column 10 there is a treatment zone 21 which essentially is composed of a plurality of superimposed adjacent compartments defined between spaced perforated trays 22. Above the uppermost perforated plate 22 in treatment zone 21, a certain amount of empty space 24 is provided to permit solids to settle and to minimize the possibility of solid material flowing out through overflow 14. Also, below the lowermost perforated plate 22 of treatment zone 21 there is provided another empty space 25 to provide a collection space for the finally treated and settled solid material.

In the operation of the apparatus of FIG. 1 in the performance of the method of this invention, solid material suspended in a liquid suspending medium is introduced continuously into column 10 through conduit 11 and treatment liquid is introduced intermittently through conduit 12 under the influence of pump 17 and synchronizer-timer 19. The liquid suspending medium which was associated with the solid material introduced through conduit 11 overflows through conduit 14 whereas the solid material introduced through conduit 11 migrates downwardly through treatment zone 21 and exits intermittently through discharge conduit 15 under the influence of pump 18 and sychronizer-timer 19 along with treatment liquid introduced through conduit 12. Synchronizer-timer 19 causes pumps 17 and 18 to operate alternately so as to provide an alternating sequence of an inlet pulse from pump 17, followed by a discharge pulse from pump 18, followed by an inlet pulse from pump 17, etc.

As an example of one field of practical application of the invention, work was done on the treatment of ground ore in a solute salt mother liquor utilizing the apparatus just described in an ore beneficiation process. In the test one hundred parts by weight of mother liquor containing ten parts by weight of solute salt together with one hundred parts by weight of ground ore of particle sizes ranging between seventy-four microns and 1.5 mm. were introduced through the feed conduit 11. One hundred and five parts of solvent in the form of water were introduced through the treatment liquid supply conduit 12. On the basis of tests run in a column of one square meter cross-sectional area having seventy-five plates installed sixteen millimeters apart for treating thirty metric tons per square meter of treatment zone cross-sectional area per hour, the pumps 17 and 18, which were of constant displacement type, were synchronized to ensure that each discharge stroke of the water injection pump 17 was, after a short interval, followed by a suction stroke of the final underflow product discharge pump 18. The pumps were operated at twenty strokes per minute with the pump 17 injecting into the column at each stroke approximately thirty-three liters of water while the pump 18 withdrew just over forty-one liters of treated underflow product suspension at each stroke.

Of that material introduced one hundred parts of liquid and one hundred parts of solids reported at the underflow discharge conduit 15 and one hundred five parts of liquid reported to the overflow conduit 14. Such operation resulted in the achievement of a result which was quite remarkable to the extent that the liquid reporting to the overflow contained 9.96 parts of the original ten parts of the solute salt of the mother liquor, and the liquid reporting to the underflow discharge conduit 15 contained the virtually negligible remaining 0.04 part of the salt. In other words, the original mother liquor was, for all practical purposes, replaced by the wash water introduced through the conduit 12 with a loss of wash water into the mother liquor amounting to only above five percent of the feed introduced.

Referring next to FIG. 2, there is shown a slightly different apparatus which was developed to provide effective desliming of ground minerals and ores in order to remove clay and clay-like materials which almost inevitably will be present in any material which has come out of the ground.

In FIG. 2, column 30 is provided with a feed inlet 31 adjacent the top thereof and a treatment liquid inlet 32 adjacent the bottom thereof. Column 30 is also provided with an overflow discharge conduit 34 adjacent the top thereof and an underflow discharge conduit 35 adjacent the bottom thereof. Column 30 may also be provided with an additional treatment liquid inlet 37 adjacent the top thereof.

In order to provide a considerable degree of turbulence in relatively small confined zones to provide for interparticle attrition which appears necessary to separate clay and clay-like materials from the remainder of the ground minerals and ores, the treatment section of column 30 is provided with a plurality of sieve tray units 41 each composed of three spaced sieve trays. Each unit 41 is provided with a central sieve tray 42 having a relatively few perforations therethrough and having, therefore, a relatively small fraction of open area. Surrounding sieve tray 42 is a pair of sieve trays 43 each having a relatively large number of openings therethrough and having, therefore, a relatively large fraction of open area.

Above the uppermost sieve tray unit 41 is a relatively large open area defined in part by an expanded section 45 on top of column 30. Expanded section 45 is provided with a plurality of vertically spaced perforated plates 46 which serve to minimize losses of solid material through the overflow conduit 34 and which serve to minimize the turbulence caused by the introduction of the dry material through inlet conduit 31.

Below the lowermost sieve tray unit 41 in column 30 there is an empty space 48 provided for collecting the finally treated and settled material, and operatively associated with this space 48 is pulsation producing device 49.

In the operation of the device illustrated in FIG. 2, dry feed is continuously introduced through inlet conduit 31 and treatment liquid is continuously introduced through conduit 32, and, if desired, also through conduit 37. Settled products containing treatment liquid are continuously withdrawn through outlet 35, and the clay and clay-like material associated with treatment liquid is continuously withdrawn through overflow conduit 34. In operation, pulsation producing unit 49 constantly serves to introduce and withdraw fluid material from space 48 below the sieve tray units 41 in column 30.

While this invention has been described and illustrated in certain embodiments, it is readily apparent that obvious equivalents exist for specific details contained in the illustrative embodiments. It is intended that all such equivalents as may be embraced within the scope of the subjoined claims are to be considered as part of this invention.

I claim:

1. In a counter-current treatment apparatus for treating a feed mixture of particulate solids with a treatment liquid, the arrangement which comprises a column of substantial vertical extent providing a vertical flow treatment zone; a plurality of transverse flow constricting structures vertically spaced from one another providing substantial flow obstructions in said vertical treatment column, each said structure having an open through flow area substantially smaller than the total cross-sectional area of the column with corresponding substantial pressure drop, said open area being uniformly distributed over said total area and designed and adapted for the downward passage therethrough of said solids, means for introducing said feed solids to said column adjacent the upper end thereof for movement downward through said openings allowing substantially uniform quantities of solids to pass simultaneously downwardly through respective openings; means for introducing treatment liquid to said column adjacent the lower end thereof for movement through said openings upward counter-current to the movement of said solids; means for discharging treatment liquor from the upper end of said column; means for discharging solids together with a portion of the treatment liquid from the lower end of said column; and means for pulsating the contents of said column in such a manner as to compel the solid particles to pass through said opening incident to each downward phase of the pulsations effecting a net downward transfer of the solids therethrough uniformly distributed across said vertical treatment zone as well as uniform upward flow distribution of pulsating liquid through said open area in the course of each pulsation.

2. The apparatus according to claim 1, wherein said pulsating means comprise means for alternately raising and lowering the contents of said column, each by a respective controlled amount.

3. Apparatus according to claim 1, wherein said means for pulsating the contents of the column comprises pump means for intermittently introducing controlled portions of the treatment liquid to said column, pump means for intermittently withdrawing controlled portions of the solids suspended in the treatment liquid from the column.

and means for synchronizing and timing the operation of said two pump means so as to provide for alternate introduction of the treatment liquid and withdrawal of the solids respectively, whereby the contents of said column is alternately raised and lowered by respective controlled amounts.

4. Apparatus according to claim 1, wherein said pulsating means comprise a pulsating unit effective to superimpose said pulsations upon the net upward flow of liquid through said treatment zone.

5. Apparatus according to claim 1, wherein said transverse structures comprise constriction plates.

6. Apparatus according to claim 1, wherein said transverse structures are constriction plates, said plates being arranged in groups of three plates closely adjacent to one another, the intermediate plate of each group having relatively fewer constriction openings providing a relatively smaller total open area, and the upper and lower plates of each group having a relatively larger number of constriction openings providing a relatively larger total open area.

7. The apparatus according to claim 1, wherein said transverse structures are constriction plates, said constriction plates being of substantially uniform construction and substantially uniformly spaced with respect to one another.

8. The apparatus according to claim 1, wherein the upper end portion of said column is formed by an expanded portion containing an arrangement of flow constriction structures to provide a stilling and solids intercepting zone.

9. Apparatus according to claim 1, wherein the upper end portion of said column is formed by an expanding portion containing an arrangement of flow constriction structures to provide a stilling and solids intercepting zone, and wherein said means for introducing said feed solids are arranged for delivering said solids into said column in a zone located in the region of the bottom of said expanded portion.

10. Apparatus according to claim 1, wherein the upper end portion of said column is formed by an expanded portion containing an arrangement of correspondingly larger transverse flow constriction structures vertically spaced from one another to provide a stilling zone, and wherein said means for introducing said feed solids are arranged to extend downwardly through said last mentioned transverse structures.

11. Apparatus according to claim 1, wherein the upper end portion of said column is formed by an expanded portion containing an arrangement of correspondingly larger transverse flow constriction structures, vertically spaced from one another, and wherein additional means are provided for introducing treatment liquid into said column substantially in a zone located at the lower end of said expanded portion.

12. Apparatus according to claim 1, wherein said transverse structures are constriction plates and the constriction openings are holes, arranged in groups of three plates closely adjacent to one another, the intermediate plate of each group having relatively fewer constriction holes providing a relatively smaller total open area and the upper and lower plates of each group having a relatively larger number of openings providing a relatively larger total open area, wherein further the upper end portion of said column is formed by an expanded portion containing an arrangement of correspondingly larger transverse constriction plates vertically spaced from one another, and wherein said means for introducing said feed solids are arranged for delivering said solids into said column in a zone located in the region of the lower end of said expanded portion, and wherein additional means are provided for introducing treatment liquid into said column substantially in a zone located in the region of the bottom of said expanded portion.

13. The method of treating a feed slurry containing particulate solids in suspension, to effect removal of the slurry liquid with a treatment liquid in a counter-current treatment operation, which comprises maintaining a vertical counter-current treatment zone of substantial extent; maintaining in said vertical treatment zone vertically spaced flow constriction zones providing substantial flow obstructions with uniformly distributed open area for solids passage substantially smaller than the total cross-sectional area of said treatment zone and with corresponding pressure drop; continuously introducing said feed slurry in the region of the upper end of said vertical treatment zone; introducing said treatment liquid in the region of the lower end of said vertical treatment zone; pulsating the contents of said treatment zone for compelling said slurry solids as well as the liquid to pass uniformly distributed through the respective flow constriction zones resulting in a net transfer of solids downwardly through the successive zones as well as in the upward displacement of a maximum of the slurry liquid by means of a minimum volume of treatment liquid moving counter-current to the solids in the course of the pulsations; removing said solids from the lower end portion of said vertical treatment zone along with a portion of the treatment liquid and substantially free of said slurry liquid, as a result of the pulsations; and removing displaced slurry liquid from the upper end of said treatment zone.

14. The method according to claim 13, wherein said slurry liquid is a mother liquor, and said treatment liquid is a wash liquid.

15. The method according to claim 13, wherein said feed slurry is an aqueous suspension, and said treatment liquid is a treatment solution.

16. The method according to claim 13, wherein said feed slurry contains said particulate material associated with clay-like material and the latter is removed from said particulate material and carried away with said discharge treatment liquid.

17. The method according to claim 13, wherein said pulsations are effected by alternately raising and lowering the column as a whole each by a respectively controlled amount.

18. The method according to claim 13, wherein the treatment liquid before discharging passes through a widened turbulence stilling zone maintained above the zone of introduction of said feed slurry.

19. The method of treating a feed mixture of particulate solids and clay-like material to effect the separation of the particulate solids from the clay-like material, which comprises maintaining a vertical counter-current flow treatment zone of substantial extent containing vertically spaced transverse flow constricting zones providing substantial flow constrictions distributed over the cross-sectional area of said zone, and adapted for the passage therethrough of said solids; maintaining a widened flow stilling zone directly above said vertical treatment zone and communicating directly therewith and provided with transverse flow constricting zones; continuously introducing said feed mixture in the region directly below said flow stilling zone; introducing a wash liquid in the region of the lower end of said treatment zones; pulsating the contents of said treatment zone in such a manner as to compel said solids to pass uniformly distributed through said constrictions with a net transfer of said solids occurring downwardly through the successive constriction zones, while maintaining interparticle attrition to encourage the segregation and washing out of clay-like material substance as a result of the pulsations with a minimum of wash liquid required; removing the cleaned particulate solids from the lower end portion of said treatment zone along with a portion of the wash liquid; and removing spent wash liquid carrying the clay material from the top end of said stilling zone.

20. The method according to claim 19, wherein additional wash water is introduced into the treatment zone in the region of the bottom portion of said stilling zone.

21. The method according to claim 19, wherein the feed mixture being introduced is a dry material.

22. The method of washing a feed mixture of particulate solids with a wash liquid in a counter-current treatment operation, which comprises maintaining a vertical counter-current treatment zone of substantial extent; maintaining in said vertical treatment zone vertically spaced flow constriction zones providing substantial flow obstructions with uniformly distributed open area for solids passage substantially smaller than the total cross-sectional area of said treatment zone and with corresponding pressure drop; continuously introducing said feed mixture in the region of the upper end of said vertical treatment zone; introducing said treatment liquid in the region of the lower end of said vertical treatment zone; pulsating the contents of said vertical treatment zone for compelling said solids as well as the liquid to pass uniformly distributed through the respective flow constriction zones resulting in a net transfer of solids downwardly through the successive constriction zones with a minimum volume of said wash liquid moving counter-current to the solids in the course of the pulsations; removing said solids from the lower end portion of said vertical treatment zone along with a portion of the wash liquid; and removing pulsating liquid from the upper end of said vertical treatment zone.

23. The method according to claim 22, wherein the feed mixture is a mixture of particulate solids and clay-like material, and wherein said clay-like material is washed out by the wash liquid.

References Cited in the file of this patent

UNITED STATES PATENTS

| | | |
|---|---|---|
| 2,354,419 | Lingerfelt | July 25, 1944 |
| 2,742,381 | Weiss | Apr. 17, 1956 |